Feb. 14, 1928.
C. FAYER ET AL
1,659,022
AUTOMOBILE SIGNAL
Filed Jan. 6, 1927
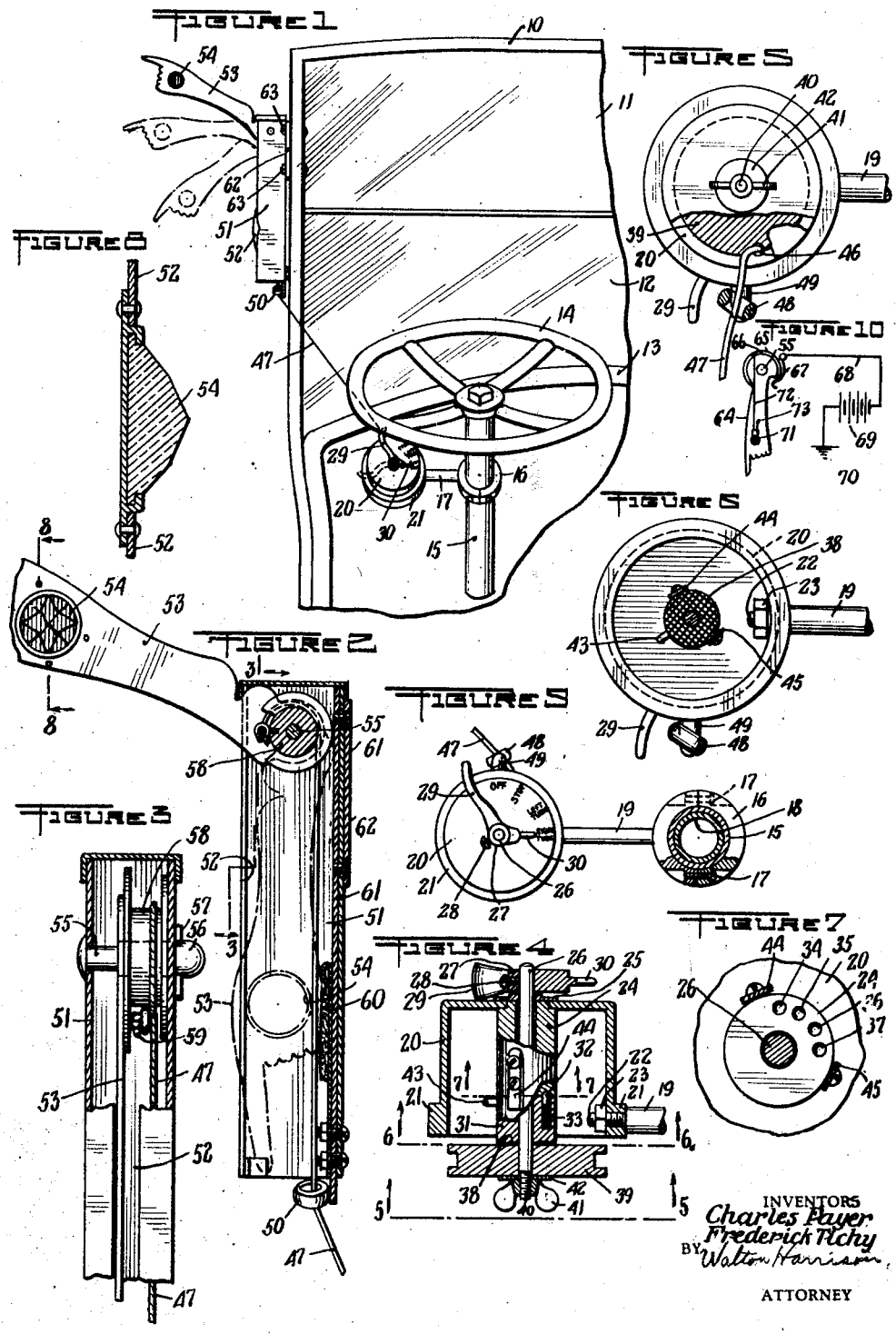
INVENTORS
Charles Fayer
Frederick Tichy
BY Walton Harrison
ATTORNEY Patented Feb. 14, 1928.

1,659,022

UNITED STATES PATENT OFFICE.

CHARLES FAYER, OF FLUSHING, AND FREDERICK TICHY, OF LONG ISLAND CITY, NEW YORK.

AUTOMOBILE SIGNAL.

Application filed January 6, 1927. Serial No. 159,275.

Our invention relates to automobile signals, of the type in which a visual signal is carried by an automobile or similar road vehicle, and operated directly by the chauffeur, so as to make visual indications, to be observed by other chauffeurs or persons who happen to be present.

More particularly stated, I seek to provide an automobile signal of this general type and having its mechanism of simple construction, so arranged and adapted as to be readily controllable by the hands of the chauffeur while he is grasping and operating the steering wheel of the automobile.

Our invention further contemplates an automobile signal of the general type here contemplated, with its various parts so constructed and arranged as to constitute practically an attachment, well adapted to be applied to and removed from an automobile or similar vehicle, already in use.

Our invention also comprehends an automobile signal of the general type above mentioned, in which a movable visual member, such as a swinging arm, is operated by aid of a flexible cord wound partially upon a drum which is rocked from time to time under manual control, and which is adjustable by hand relatively to other parts, in order to take up the slack of the cord or to regulate the same.

Our invention contemplates, in addition, various improvements in the mechanism of automobile signals, for the purpose of increasing the efficiency thereof.

Reference is made to the accompanying drawing forming a part of this specification, and in which like reference characters indicate like parts throughout the several figures.

Figure 1 is a fragmentary rear elevation of our device, as mounted and used upon an automobile;

Figure 2 is a vertical section through the casing in which the signal arm is journaled, and indicates, by full and broken lines, two positions of the signal arm;

Figure 3 is a fragmentary section on the line 3—3 of Figure 2, looking in the direction indicated by the arrows;

Figure 4 is a substantially central section through the cylindrical casing in which is mounted certain portions of the actuating mechanism;

Figure 5 is partly a bottom plan and partly a section, through the cylindrical casing, shown in Figure 4;

Figure 6 is a section on the line 6—6 of Figure 4, looking in the direction indicated by the arrows;

Figure 7 is a section on the line 7—7 of Figure 4, looking in the direction indicated by the arrows;

Figure 8 is a section on the line 8—8 of Figure 2, looking in the direction indicated by the arrows;

Figure 9 is a section through the steering column, and shows in plan the cylindrical casing carried by the steering column and serving as a container for certain parts;

Figure 10 is a diagram of a modified form of our device, in which the swinging arm carries an electric lamp to increase its visibility.

An automobile body appears at 10, and at 11 and 12 are shown the upper and lower portions of a dash board.

The foot board appears at 13, the steering wheel at 14, and the steering column at 15.

Detachably mounted upon the steering column 15 is a clamping ring 16, of the form shown more particularly in Figure 9, and provided with clamping bolts 17. By removing these bolts the two parts of the clamping ring 16 may be separated. Thus the clamping ring 16 may be fitted upon or removed from the steering column, or adjusted relatively to the same.

The clamping ring 16 carries a supporting pin 19 extending laterally from it, and the supporting pin 19 carries at its outer end a casing 20 having a substantially cylindrical form, as indicated more particularly in Figure 4. The casing 20 is provided with a massive ringlike portion 21, through which extends a reduced threaded portion 22 of the supporting pin 19. A nut 23 is fitted upon the threaded portion 22, and holds the parts firmly together.

The casing 20 carries a bearing 24 having the form of a cylinder, and connected with the bearing 24 is a washer 25.

A shaft 26 extends through the bearing 24 and washer 25, and thus axially extends through the casing 20 as may be understood from Figure 4.

Fitted upon the upper end of the shaft 26 is a collar 27, held in position by a set screw 28. The collar 27 carries a thumb piece 29 and a pointer 30, as may be understood from Figure 9. The pointer 30 is adapted to move relatively to the legends Off, Stop, Left turn, and Right turn. These legends, four in number, are associated with four conditions related to the status of the automobile. The operator by shifting the thumb piece 21 so as to move the pointer 30, can bring this pointer into proximity to any one of the four legends, and in doing this, he causes an indication to be made, as hereinafter more particularly described.

Mounted fixedly upon the shaft 26, and revoluble therewith relatively to the cylindrical bearing 24 is a cylinder 31, carrying a pawl 32 and a spring 33, as indicated more particularly in Figure 4. The pawl 32 is so formed and arranged as to protrude slightly from the cylinder 31, in consequence of the action of the spring 33. The cylindrical bearing 25 is at its lower end provided with ratchet notches 34, 35, 36 and 37, shown more particularly in Figure 7. These ratchet notches are so formed and arranged that the pawl 32 can protrude slightly into them, one at a time, as may be understood from Figure 4. Whenever the pawl 32 thus protrudes into any one of the notches, the cylinder 31 and consequently the shaft 26 is for the time being secured rather firmly in relation to the casing 20. However the operator, by shifting the thumb piece 29, as above described, can dislodge the pawl 32 and thus turn the shaft 26 a sufficient distance to enable the pawl to protrude slightly into the next successive notch. Thus as the pointer 30 is shifted from one legend to another, as above described, the pawl 32 is correspondingly shifted from one ratchet notch to another, so that the pointer 30 is maintained in proximity to some one of the legends at any given moment, and the various movable parts are not readily disturbed except when the chauffeur actuates the thumb piece 29.

One important purpose of our invention is to enable the chauffeur to keep his hands upon the steering wheel 14, and yet be able to use one of his thumbs for actuating the thumb piece 29. For this purpose, the casing 20 is located in close proximity to the steering wheel 14, so as to enable the operator to reach down, with the thumb of one hand, and without any difficulty actuate the thumb piece 29. This has been found in practice to be accomplished quite easily.

The lower end of the cylinder 31 is provided with a rough surface 38, and this rough surface engages the adjacent surface of a drum 39, fitted neatly but loosely upon the shaft 26. This shaft is provided with a threaded portion 40 of reduced diameter, and fitted upon this threaded portion is a wing nut 41, which engages a ring washer 42.

The operator, by turning the wing nut 41, loosens it relatively to the shaft 26. This leaves the drum 39 loose, so that the operator can turn this drum to any desired extent or adjust it into a given angular position, and this done, by turning the wing nut 41 can tighten both the wing nut and the drum 39.

The cylindrical bearing 25 carries two spring strips 44 and 45, and the revoluble cylinder 31 carries a stop pin 43. These parts act as a limiting stop for preventing excessive travel of the shaft 46 and parts carried thereby, as this shaft is rocked back and forth, as above described.

Secured to the drum 39 at the point 46, and partially wound upon the drum, is a cord 47. This cord extends through an eye 48, the latter being supported by a boss 49, this boss being mounted rigidly upon the casing 20, as shown more particularly in Figures 5 and 6. The eye 48 is made of metal and polished, so that the cord may move through it with comparative freedom.

The cord 47 extends diagonally upward from the drum 39 and eye 48 to another eye 50, the latter being mounted upon the lower end of a metallic casing 51 of the form shown in Figures 1, 2 and 3.

The casing 51 is provided with an open slot 52. A movable arm 53 is journaled within the casing 51, and is adapted to swing back and forth through the open slot 52.

The swinging arm 53 carries a ruby crystal 54, to increase its visibility. The ruby crystal is mounted upon the arm 53 by the setting shown in 58, and need not be further described as to its construction, which is well known in this art.

In order to journal the arm 53 within the casing 51, I provide this casing with a journal bolt 55, having a head 56, through which extends a cotter pin 57, as indicated in Figure 3.

The journal bolt 55 extends through a spool 58, serving as a bearing, and free to turn relatively to the journal bolt 55. The cord 47, extending upwardly through the eye 50 and practically to the top of the casing 51, is secured by a fastening 59 directly to the spool 58.

Mounted within the casing 51 is a cushion 60, so located that the arm 53 can strike against it in swinging downwardly into its normal position of inactivity, as indicated by broken lines in Figure 2. This prevents the arm from making a discordant noise as it drops, and also saves the casing from undue pounding by the arm.

The casing 51 is provided at its back with a double thickness of material 61, which increases its strength and durability.

The casing 51 carries an attachment plate 62, which by means of fastenings 63 may be detachably secured upon the side of the automobile, as indicated in Figure 1.

As may be readily understood from the foregoing description, our device is well adapted for use as an attachment for automobiles and similar road vehicles. That is to say, while our device may be permanently built into the automobile where the latter is built at the factory, it may be sold and used as a separate article of manufacture, to be mounted upon practically any automobile or similar vehicle, already built.

Not only that, but after our device is applied to an automobile already built, it can be readily detached and transferred to any other automobile.

It may sometimes happen that, through the unavoidable stretching of the cord 47 or through accidental misplacement of some of the movable parts, the cord 47 may be a little too long, and in some instances it may be a little too short. As above described, the operator can adjust the drum 39 relatively to the cylinder 31 and thus to the shaft 26, and in so doing can wind up or let out the cord 47, so as to render the various parts true.

As indicated by full and broken lines in Figure 1, the arm 52 is movable into three positions. These three positions mean, respectively, right turn, left turn, and stop, as may be understood from the legends above described with reference to Figure 9. Besides the three positions, indicated in Figure 1, the arm 52 has still another position, indicated by broken lines in Figure 2. This last mentioned position is one of absolute idleness, and is indicated by the legend Off.

In Figure 10 we show a modified form of our device. The swinging arm is shown at 64, and revoluble with it is a sector 65 of conducting material, insulated from it by means of insulation 66. A contact brush 67 is so constructed and arranged as to engage the sector 65 whenever the arm 64 is swung outwardly. From the contact brush 67 a conductor 68 leads to a battery 69, the latter being grounded at 70 upon the machine. An electric bulb 71 is carried by the arm 64, and is connected by a wire 72 with the sector 65. The bulb is connected at 73 with the arm 64, and is thus grounded upon the machine.

In the form of our device shown in Figure 10 and just described, the electric bulb 71 is energized by current from the battery 69 and thus illuminated, whenever the arm 64 is swung outward. Thus the electric bulb 71 and its connections serve to increase the visibility of the arm 64. Except as otherwise above indicated the structure and action of the form of our device shown in Figure 10 is the same as that contemplated by the other figures.

The operation of our device may be readily understood from the foregoing description. The various parts being constructed, assembled and arranged as shown in the drawing and as above described, our device is ready for use.

The operator, usually a chauffeur, normally keeps his hand upon the steering wheel 14, in manner well known in this art for purposes of driving an automobile. If, now, the chauffeur desires to exhibit a visual signal, to apprise other chauffeurs or bystander of the status of his automobile at any particular instant, he accomplishes this purpose by merely shifting the thumb piece 29, thereby causing a corresponding movement of the arm 52 or 64, as the case may be. The operator by glancing at the legends shown in Figure 9 and above described, and noting the relative position of the pointer 30, can readily determine the position of the arm 52. The operator soon learns from experience how to operate the thumb piece 29 without looking at the legends, or in other words, being guided altogether by the sense of touch. Even in this case, however, he still looks at the legends occasionally and compares them with the position of the pointer 30. This is particularly true in instances where the operator wishes to adjust the drum 39 in order to take up or let out the cord 47, and thus to render the various positions of the swinging arm true and accurate, as compared with the indications made by the pointer 30 and the legends shown in Figure 9.

We do not limit ourselves to the precise mechanism herein shown and described, as variations may be made therein without departing from our invention, the scope of which is commensurate with our claims.

Having thus described our invention, what we claim as new and desire to secure by Letters Patent is as follows:

1. In a device of the character described the combination of a casing, a signal carried thereby, a cord connected with said signal and movable for changing the condition of said signal and causing it to make different indications, a drum connected with said cord and movable under manual control for the purpose of actuating said cord, and mechanism connected with said drum and controllable by the operator for the purpose of taking up and letting out the slack of said cord.

2. In a device of the character described, the combination, with an automobile having a body member, a steering column and a steering wheel movable relatively to said steering column, of a signal carried by said automobile body, mechanism mounted upon said steering column and including a movable actuating member located in close proximity to said steering wheel to enable the operator to move said actuating member by hand while holding said steering wheel, connections from said actuating member to said signal, for causing movements of said actuating member to actuate said signal, and means controllable by the operator for adjusting said connections, as between said actuating member and said signal.

3. In an automobile signal the combination, with an automobile body, a steering column and a steering wheel movable relatively to said steering column, of a casing, means for supporting the same, a shaft extending into said casing and journaled to rock relatively thereto, a drum connected with said shaft and adapted to rock therewith, a flexible member partially wound upon said drum, a signal carried by said automobile body and controllable by movements of said flexible connection as actuated by the rocking of said drum, and mechanism carried by said automobile body and connected with said drum for indicating to the operator the condition of said signal.

4. In a device of the character described the combination, with an automobile body and a steering column and steering wheel, of a clamping collar mounted upon said steering column, a casing supported by said clamping collar, a bearing carried by said casing, a shaft journaled in said bearing, a drum mounted upon said shaft, a flexible connection secured to said drum and adapted to be wound and unwound therefrom, and a signalling member secured to said flexible connection and operable by movements thereof.

5. A device of the character described comprising a steering column, a clamping collar detachably mounted upon said steering column, a casing supported by said clamping collar, a bearing carried by said casing, a shaft journaled in said bearing, a drum mounted upon said shaft and normally fixed thereupon, means controllable by the operator for loosening said drum relatively to the shaft in order to adjust the drum relatively to the shaft, a flexible connection secured to the drum, and a signal secured to said flexible connection and operated by movements thereof.

6. In a device of the character described the combination with an automobile body, a steering column and a steering wheel, of a casing, means for supporting said casing upon said steering column and in close proximity to said steering wheel, a bearing carried by said casing, a shaft journaled in said bearing, means controllable by the operator and located within easy reach of said steering wheel for enabling the operator to turn said shaft, a signal carried by said automobile body, and connections from said shaft to said signal, for enabling the turning movements of said shaft to actuate said signal.

7. A device of the character described comprising a casing, means for supporting the same upon an automobile body, a bearing carried by said casing, a shaft journaled upon said bearing, a cylindrical member carried by said shaft and provided with a rough surface, a drum mounted upon said shaft and normally engaging said rough surface, means for adjusting said drum relatively to said rough surface, and ratchet mechanism carried by said cylindrical member and coacting with said bearing for retaining said shaft in definite positions in which it is turned from time to time, a signalling member, and a flexible connection extending from said visual signalling member to said drum, for enabling movements of said drum to actuate said signalling member.

CHARLES FAYER.
FREDERICK TICHY.